W. J. BUCKLEY.
MAGNETIC FLAME WELDING MACHINE.
APPLICATION FILED OCT. 31, 1918.
1,343,346.
Patented June 15, 1920.
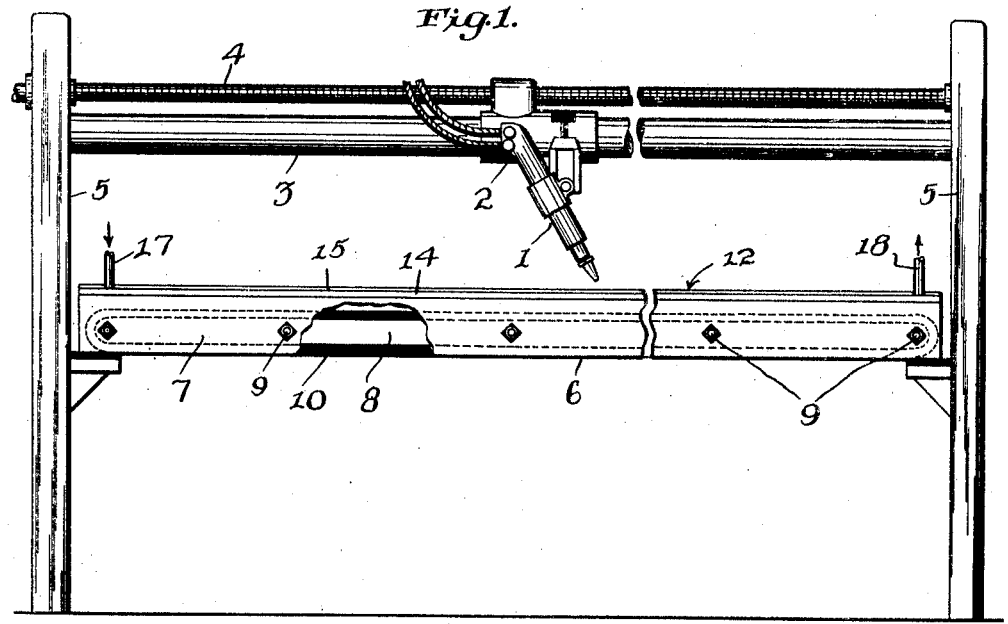
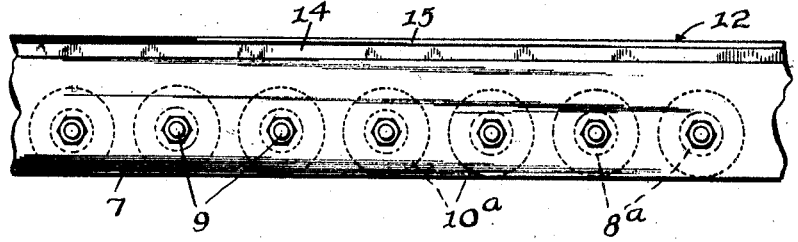
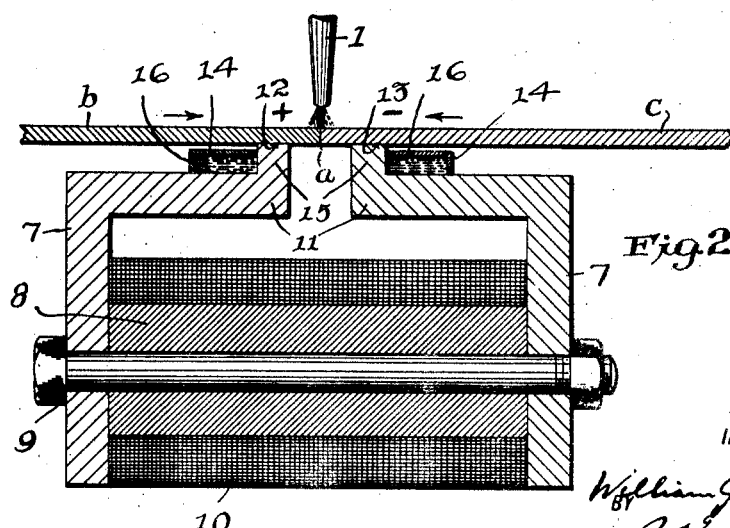
INVENTOR
William J. Buckley
ATTORNEY

UNITED STATES PATENT OFFICE.

WILLIAM J. BUCKLEY, OF EAST ORANGE, NEW JERSEY, ASSIGNOR TO DAVIS-BOURNONVILLE COMPANY, OF NEW YORK, N. Y., A CORPORATION OF NEW YORK.

MAGNETIC FLAME-WELDING MACHINE.

1,343,346.   Specification of Letters Patent.   Patented June 15, 1920.

Application filed October 31, 1918. Serial No. 260,460.

*To all whom it may concern:*

Be it known that I, WILLIAM J. BUCKLEY, a citizen of the United States, and a resident of East Orange, in the county of Essex and State of New Jersey, have invented a new and useful Magnetic Flame-Welding Machine, of which the following is a specification.

The invention is concerned with the problem of butt-welding the edges of sheets, barrel bodies, large diameter tubes, and other sheet-metal parts, and plates, by the autogenous welding flame in automatic machinery, and is an improvement within and upon the disclosure of my Patent No. 1,335,873, dated April 6, 1920.

The magnetic holder is preferably characterized by narrow or strip-form polar faces, affording parallel lines of holding adjacent opposite sides of the seam. It is also desirable so to organize the magnetic circuit as to cause the magnetic flux to pass through the work across the seam. An advantageous construction comprises a holding magnet of general horseshoe or elongated box-like form disposed at one side of the work in position to embrace with its polar faces the vertical plane of the seam.

In the accompanying drawing forming a part hereof:

Figure 1 is a side elevation, partly broken away and in section, of a simple apparatus embodying the invention;

Fig. 2 is an enlarged cross-section; and

Fig. 3 is an enlarged fragmentary side elevation showing a modification.

The drawing indicates at 1 an oxyacetylene or other autogenous welding torch. This is mounted adjustably on a carriage 2 which may be propelled at predetermined uniform speed along a bar 3 by a screw shaft 4, which may be understood to be rotated by power and subject to speed-controlling means, not shown. The bar and shaft are shown supported at their opposite ends in uprights 5, but it will be understood that a projecting arm construction may be used instead, and that in general these parts are merely representative of suitable means for delivering the welding flame and for supporting said means in definite relation to the work and for effecting relative welding travel between the flame and the work lengthwise of the seam.

The preferred form of the electro-magnetic means comprises a trough-like or elongated box-like, horseshoe-style magnet 6, which is shown supported at its ends upon the uprights, but which may also be a projecting arm. This magnet comprises longitudinal side members or pole pieces 7, connected and spaced by a core 8 and bolts 9. The core 8 of Figs. 1 and 2 extends lengthwise, and bears a coil 10, likewise wound lengthwise, but, as indicated in Fig. 3, a series of individual cores and coils 8$^a$, 10$^a$ may be employed.

The magnet is disposed in position to embrace the plane of the seam $a$, and the portions 11 of its pole pieces which are adjacent the work are extended inward toward each other, into proximity to the seam, where they bear raised, strip-form polar holding faces 12 and 13 of opposite sign, the face 12 being regarded as positive or a north pole, and the face 13 as negative or south.

The drawing shows pole faces approximately twice as wide as the thickness of the metal of the sheets $b$ and $c$, but narrower faces may be employed with advantage if the surfaces of the poles and work are smooth and make good contact; conversely, with greater unevenness the faces must be made wider.

Strips 14 are welded onto the pole pieces in the angles of the lips 15 bearing the strip-form pole faces; and the passages 16 thus formed in or on the holding portions are connected at their ends with pipes 17, 18, by means of which a circulation of cooling medium is maintained during the welding operation. This preserves the efficiency of the seam-holder, which would otherwise be impaired by the demagnetizing effect of the heat of the flame.

In the illustrated construction, the torch is above the work, and the magnetic holder beneath, the sheets $b$, $c$ being laid upon the poles, but this arrangement may be varied. The work is represented as being two flat sheets, but it may be of other characters, the invention being particularly useful, for example, in welding the longitudinal seams of barrel bodies and the like, and in general the holding means may be specifically designed for different kinds of manufacture.

With a construction such as illustrated a powerful grip is secured upon the two parts to be united at regions adjacent the seam by means located at one side of the work, the edges being thus held in butt relation to each other and against displacement relatively to the flame. In addition, when the work is placed against the poles and the magnet energized, the magnetic force will shift the parts inward, as indicated by the arrows in Fig. 2, so as positively to cause the edges to abut at the central plane, and in some instances this action may be strong enough to cause a thickening of the weld when the edges become fused.

What I claim as new is:

1. In apparatus for welding sheets and the like by the autogenous flame, the combination of mechanically supported means for delivering the flame upon the edges to be united, and elongated box-like electro-magnetic means embracing the plane of the seam for holding the parts of the work with their edges in opposed relation.

2. Apparatus for welding sheets and the like by the autogenous flame, having mechanically supported means for delivering the flame upon the edges to be united, and in combination therewith electro-magnetic means having holding portions of opposite polarity at opposite sides of the plane of the seam, adapted to hold the parts of the work against said polar portions with their edges in opposed relation and simultaneously to draw the parts together.

3. Apparatus for welding sheets and the like by the autogenous flame, having mechanically supported means for delivering the flame upon the edges to be united, and in combination therewith electro-magnetic means for holding the parts of the work in opposed relation, constructed to cause the magnetic flux to pass across the seam.

4. Apparatus for welding sheets and the like by the autogenous flame, having mechanically supported means for delivering the flame upon the edges to be united, and characterized by means for holding the parts with their edges in opposed relation comprising a trough-like electromagnet embracing the plane of the seam.

5. Apparatus for welding sheets and the like by the autogenous flame, having mechanically supported means for delivering the flame upon the edges to be united, and characterized by trough-like electro-magnetic means for holding the parts of the work in opposed relation having strip-form polar holding faces at opposite sides of the plane of the seam.

6. Apparatus for welding sheets and the like by the autogenous flame, having mechanically supported means for delivering the flame upon the edges to be united, and characterized by electro-magnetic means for holding the parts with their edges in opposed relation comprising longitudinal members the pole-face portions of which approach each other and possess narrow polar holding faces at opposite sides of the plane of the seam and a core portion with energizing means connecting said side members.

7. Apparatus for welding sheets and the like by the autogenous flame, having mechanically supported means for delivering the flame upon the edges to be united, and characterized by electro-magnetic means for holding the parts with their edges in opposed relation, the magnetic circuit of said means having strip-form polar faces of opposite sign disposed at opposite sides adjacent the plane of the seam, across which the magnetic flux is caused to flow.

WILLIAM J. BUCKLEY.